(12) United States Patent
Johnson

(10) Patent No.: US 7,743,576 B2
(45) Date of Patent: Jun. 29, 2010

(54) DEPLOYABLE AND RETRACTABLE SPACE FRAME

(75) Inventor: Samuel Alan Johnson, Loveland, CO (US)

(73) Assignee: S.A. Robotics, Loveland, CO (US)

( * ) Notice: Subject to any disclaimer, the term of this patent is extended or adjusted under 35 U.S.C. 154(b) by 1701 days.

(21) Appl. No.: 10/771,935

(22) Filed: Feb. 5, 2004

(65) Prior Publication Data
US 2005/0183377 A1   Aug. 25, 2005

(51) Int. Cl.
*E04H 12/18* (2006.01)
(52) U.S. Cl. .......................... 52/646; 52/645; 52/648.1
(58) Field of Classification Search ............... 52/648.1, 52/646, 639, 640, 641, 644, 645, 108, 109, 52/111
See application file for complete search history.

(56) References Cited

U.S. PATENT DOCUMENTS

| 3,261,308 | A | * | 7/1966 | Szymber | 108/145 |
| 4,532,742 | A | * | 8/1985 | Miura | 52/108 |
| 4,578,919 | A | * | 4/1986 | Amadon et al. | 52/645 |
| 4,599,832 | A | * | 7/1986 | Benton et al. | 52/118 |
| 4,662,130 | A | * | 5/1987 | Miura et al. | 52/108 |
| 4,866,892 | A | * | 9/1989 | Satoh et al. | 52/108 |
| 4,958,474 | A | * | 9/1990 | Adams | 52/646 |
| 5,003,736 | A | * | 4/1991 | Okazaki et al. | 52/108 |
| 5,154,027 | A | * | 10/1992 | Warden | 52/108 |
| 5,941,400 | A | * | 8/1999 | Lemaire | 211/201 |

* cited by examiner

*Primary Examiner*—Richard E Chilcot, Jr.
*Assistant Examiner*—Jessica Laux
(74) *Attorney, Agent, or Firm*—Holland & Hart LLP

(57) ABSTRACT

A deployable and retractable space frame structure which requires no assembly, and can be either manually or automatically activated. It comprises rigid end rings or the like which attach to a multitude of spaced trusses of generally slender aspect ratio. The trusses are fabricated of two or more generally rigid, beam like strips which are hinged so as to become very flexible and non rigid when hinged strip elements lie planarly flattened, thus allowing the structure to collapse into a minimum volume state. In this configuration truss beams assume a curvature approximating the curvature of the structure end rings. Upon deployment, the truss beams become straight, and hinged beam-like strips fold to create a triangular cross sectional moment of inertia to become very rigid and straight. The structure is deployable and stow-able an infinite number of times, and is suitable for a wide variety of applications including telescope structures, portable building and antennae masts, planetary vehicles, space stations, and the like.

6 Claims, 7 Drawing Sheets

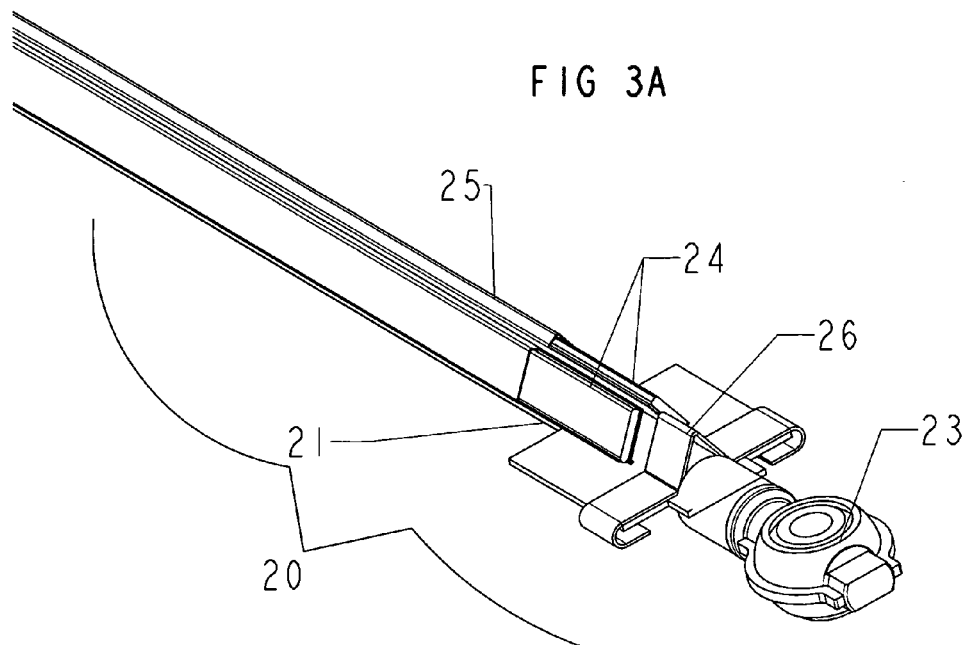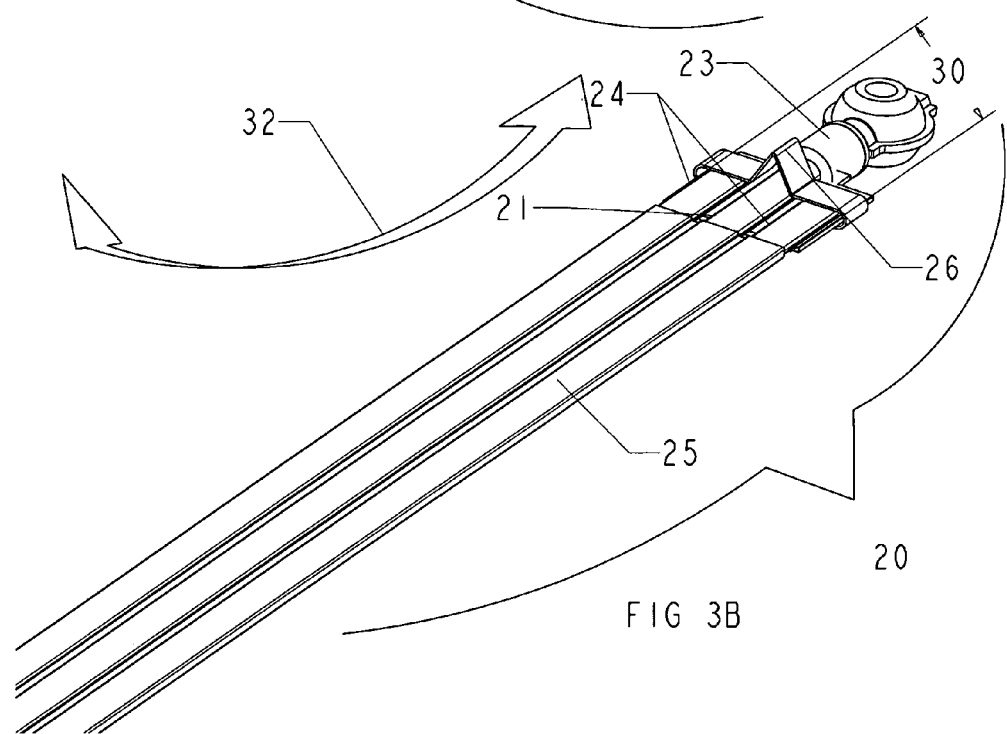

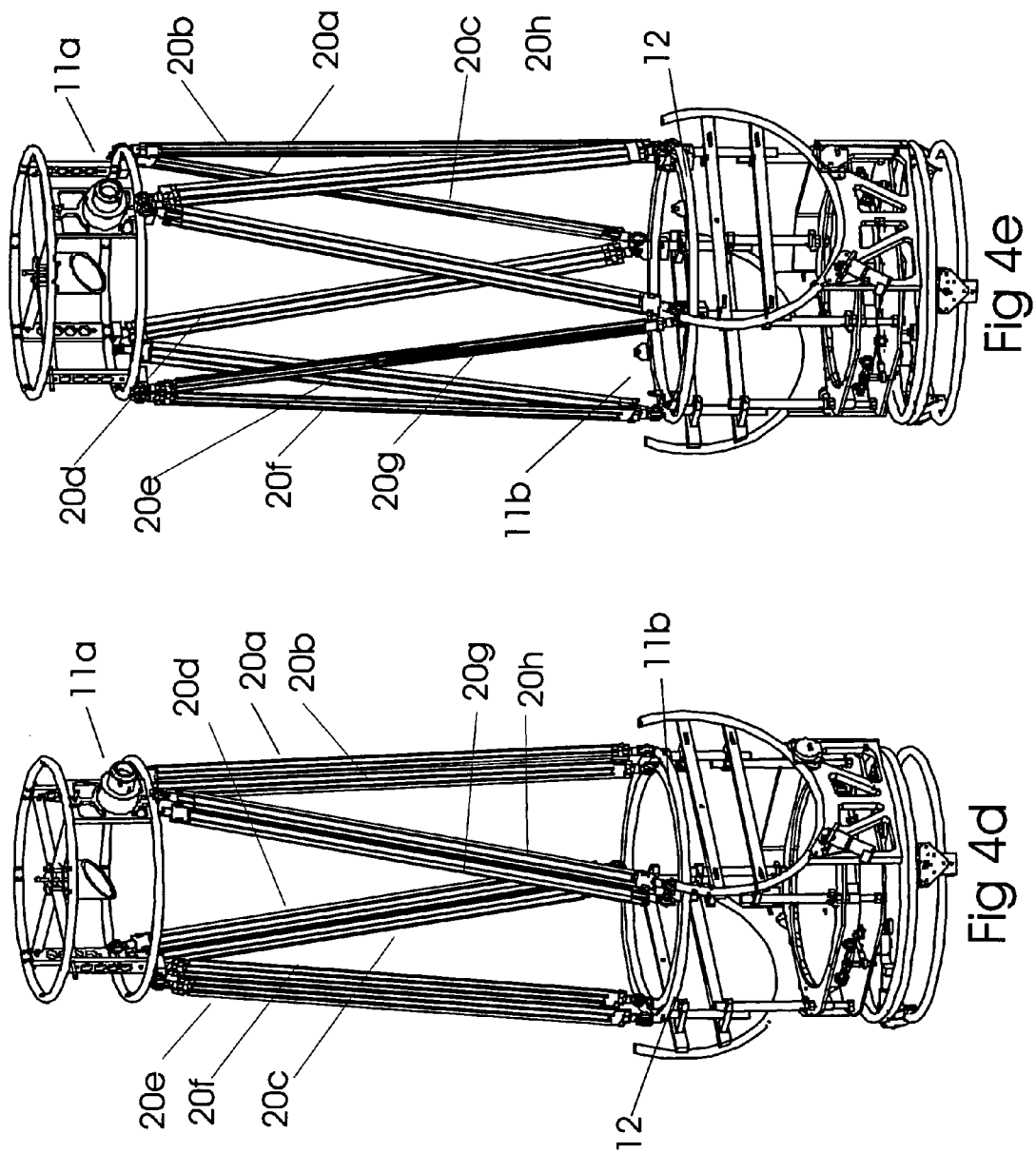

DEPLOYABLE AND RETRACTABLE SPACE FRAME

BACKGROUND OF THE INVENTION

A wide variety of applications require lightweight, rigid, precision structures which can be assembled into the intended application and disassembled into small packages for transport. In the field of telescope construction, the mounting of precision optical elements has been historically affected by rigid tubes generally in excess of the optics diameter. Such tubes are manufactured of aluminum, fiberglass or other composites, paper laminates, etc. These tubes are quite large, heavy, and not easily transportable. Other tube designs employ the use of space frame trusses, in which rigid tubular beams arrayed around the periphery of rigid end rings or plates, which triangulate and rigidify the structure. The disadvantage of this approach to portable systems is the assembly/disassembly process, which requires complex attachment and detachment of the always rigid truss beam elements, requiring cumbersome fixturing and pre-alignment to assemble. Still other designs use telescoping truss elements, which nest one inside the other. All these have the disadvantages of complexity of construction, inability for automated deployment, and large volumetric consumption. The invention proposed solves the drawbacks and limitations of the prior art, and allows for a fully automatic deployable and retractable space frame structure which requires no assembly, can be deployable and stow-able an infinite number of times, and is suitable for a wide variety of applications including telescope structures, portable building and antennae masts, planetary vehicles, space stations, and the like.

DESCRIPTION OF THE DRAWINGS

FIG. 3a shows in isometric perspective the construction of the hinged truss beam.

FIG. 3b shows in isometric perspective the construction of the hinged truss beam when folded flat.

FIG. 4a, 4b, 4c, 4d, and 4e show the deployment sequence of the present invention.

DETAILED DESCRIPTION OF THE INVENTION

Figure 1:
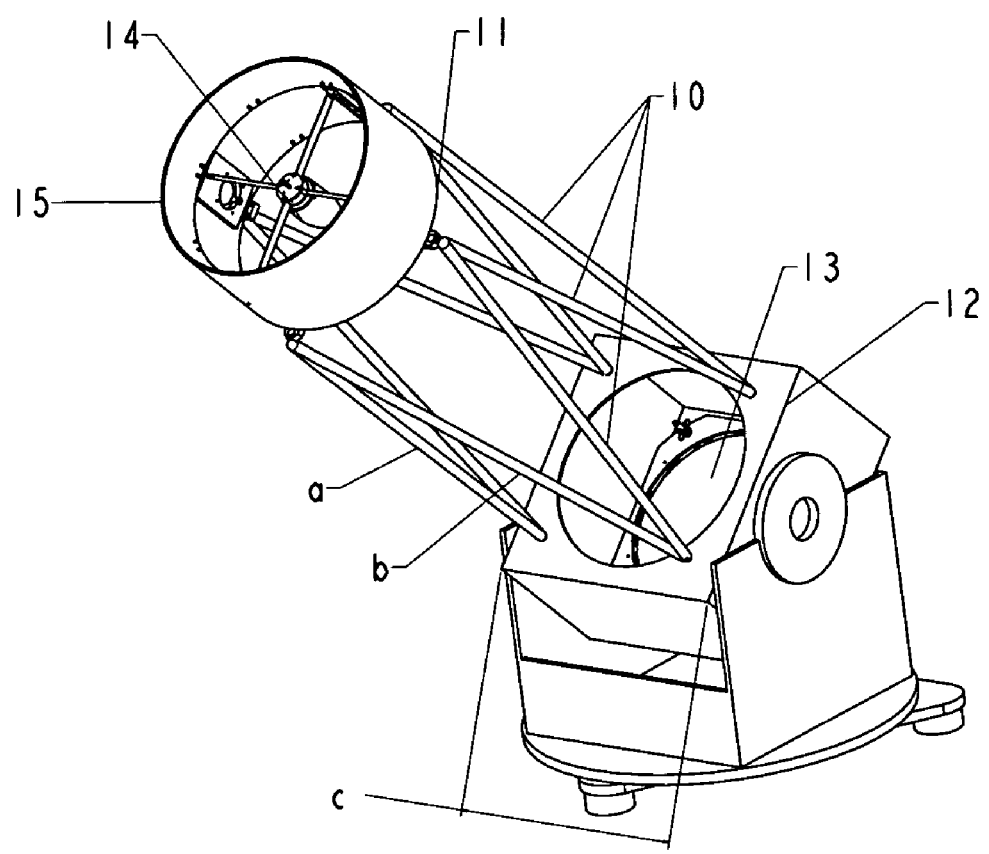
FIG. 1 shows an isometric schematic view of the prior art truss type telescope construction.

Referring to FIG. 1, there is seen an isometric perspective of the prior art, wherein truss tube elements 10 are arranged to form triangular structural elements having legs a, b, and c around the periphery of upper tube assembly 11 and base rocker box 12, respectively. When trusses 10 are rigidly attached to 11 and 12, the entire structure likewise becomes very rigid. The drawbacks and limitations of this design are succinctly described in previous sections of this application.

Figure 2:
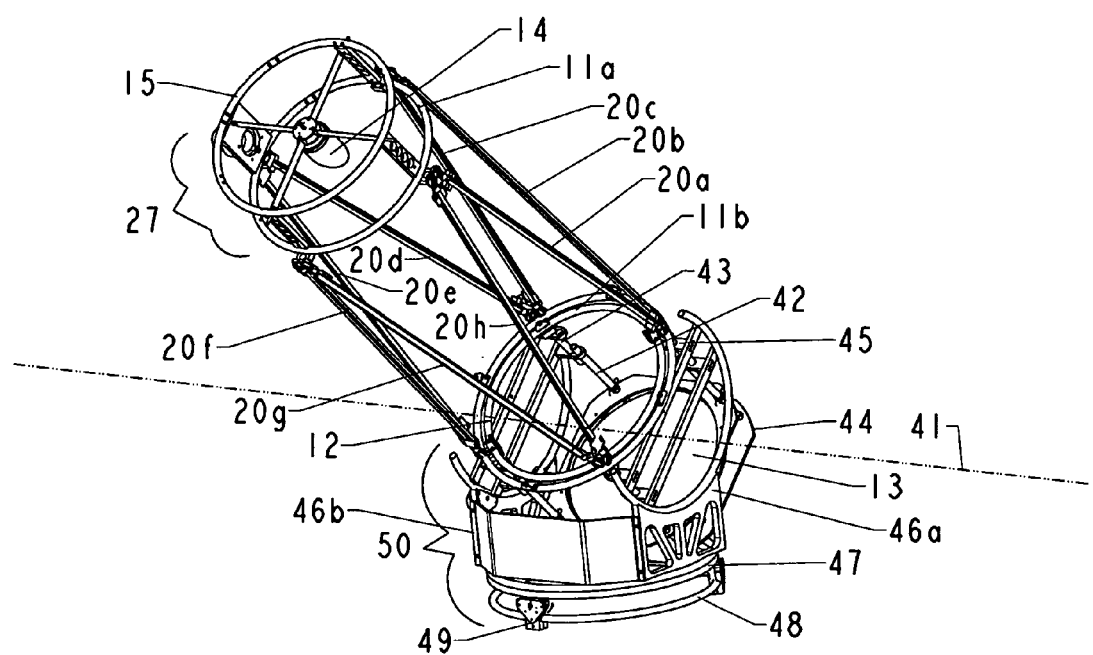
FIG. 2 shows an isometric schematic view of the present invention utilized in a large aperture portable telescope.

Referring to FIG. 2, there is shown the present invention in a preferred embodiment of a telescope structure in deployed, functional state. For such telescopes, and optical instruments in general, it is mandatory that alignment and spacing of optical elements 13, 14, and 15 remain within nearly perfect alignment and positioning to within tight tolerances, regardless of external forces or orientations. For a typical telescope structure, 13 represents the primary mirror, 14 represents the secondary mirror, and 15 represents the image capture device, whether eyepiece, film, or camera apparatus. It can be seen that a very large portion of the enclosed volumetric space is largely empty. This is a necessary condition for the spacing prescription of the optical elements. End rings 11a, 11b and 12 perform the functions of attachment rings to the trusses 20a-h and other optical and mechanical elements, such as primary mirror 13, secondary mirror 14, and image capture apparatus 15.

Referring to FIG. 3a, truss element 20a-h is seen in more detail. It comprises a central flat beam 21, of generally rectangular cross section, which is rigidly attached at either end to commercially available spherical balljoint assembly 23. Use of such a balljoint to attach truss elements 20a-h to end rings 11 and 12 provides for pinned constraints which can allow for rotational freedom during stowage and deployment, as will be seen. Outrigger beams likewise attach to central beam 21 by means of flexible hinge device 25. Such flexible hinge device can be strips of adhesively backed flexible tape attached to beam elements 21 and 24 on either one or both sides. In the preferred embodiment, flexible hinge device 25 is comprised of a sewn pocketed fabric joint, into which are inserted the three rectangular beam elements 21 and 24, of which there are two in the preferred embodiment. Such a joint construction has the advantages of infinite flexural cycles, high strength, and no adhesive failure mechanisms. Also, if desired, the hinge material can be sewn to create a tubular extrusion, capable of being sealed and inflated for the purpose of an automatic deployment mechanism wherein 4 beams might be sewn into a pocketed hinge to create a hollow square cross section when inflated, yet lie flattened when deflated and in a stowed state.

In the preferred embodiment, truss beams 21 and 24 are of identical cross sectional shapes and manufactured from a composite material such as a carbon fibre composite, possessing high bending modulus, high yield strength, high flexural rigidity, low thermal expansion coefficient, and lightweight construction. Other materials, such as metals, plastics, or composites may of course be substituted, depending on the desired performance. Spherical ball joint assemblies 23 attach truss elements to attachment points on end rings 11a, 11b, and 12 so as to become triangulated when deployed, and to align in parallel pairs when stowed.

Referring to FIG. 3b, representative truss element 20 is seen to be in a flat, flexible orientation. When truss elements 21 and 24 lay flat, so as to cause their neutral cross sectional axis's to be aligned and planar with single neutral axis plane 30, the resistance to bending along the neutral axis plane 30 is minimized, thus the flattened beam assembly 20 can assume a bent radii of curvature as represented by curved plane 32. It is in this flattened state that the entire structure can be collapsed and stored, so as to represent the volumetric efficient condition a shown in FIG. 4a. As long as the outer fibers of the truss elements do not exceed the material yield strength $\sigma_y$ while in a curved state, the truss elements 21, 24, and 25 will always return to their natural straight state when released.

Figure 3C:
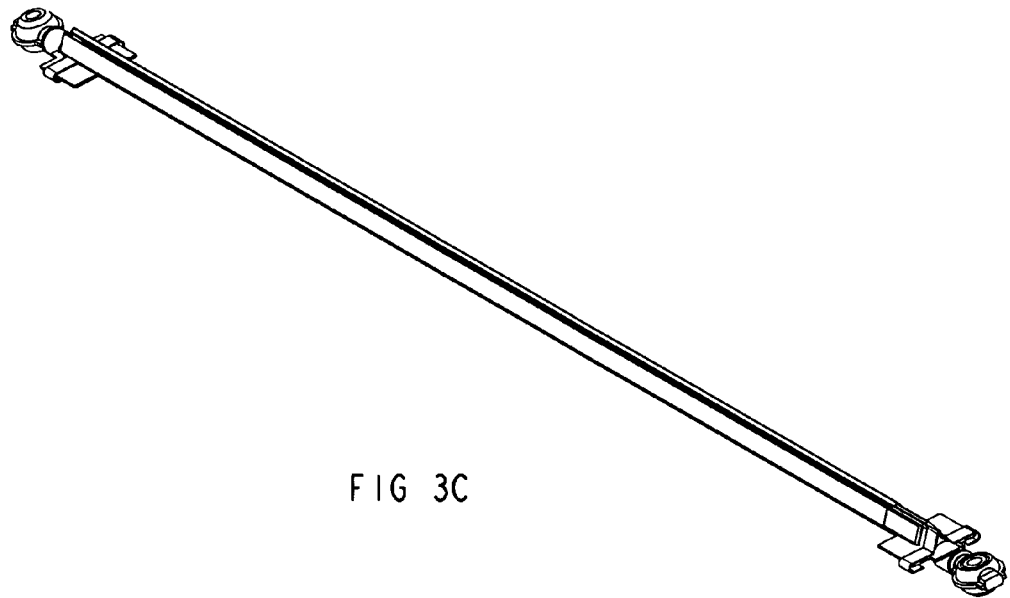
FIG. 3c shows in isometric perspective the construction of the hinged truss beam when folded into a highly stiff and rigid state.
Figure 3D:
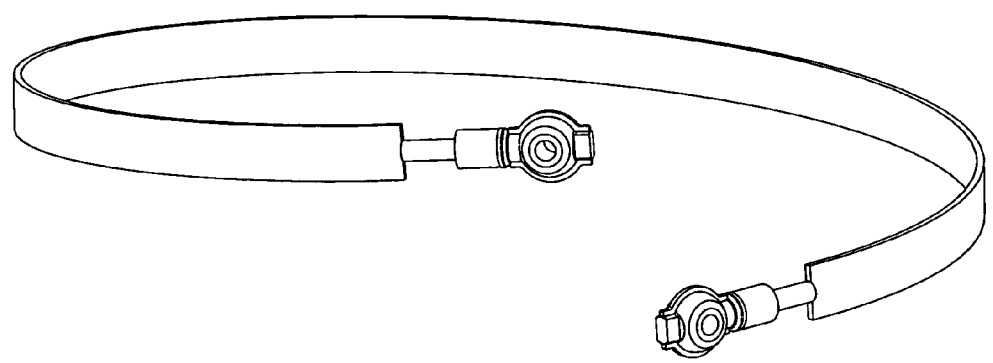
FIG. 3d shows in isometric perspective the construction of the hinged truss beam in a curved state.

Referring to FIG. 3c, representative truss element 20 is seen to be in a straight, rigid orientation. This is caused by the creation of a high cross sectional moment of inertia of the triangular cross section. It is noted that such a triangular cross section, while theoretically preferred, is not required for the truss element to become rigid. It has been shown that angular displacements for elements 24 with respect to element 21 of merely 5 degrees causes very significant and adequate rigidifying of truss element 20, even when only a single outrigger beam is constructed. Referring to FIG. 3d, there is shown the flattened strut in a curved state.

Figure 4A:
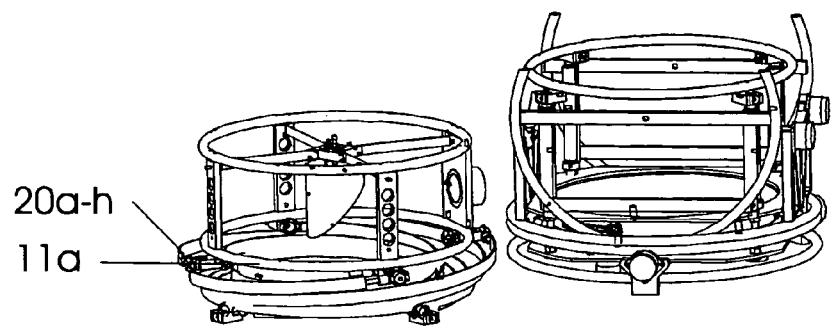
Figure 4B:
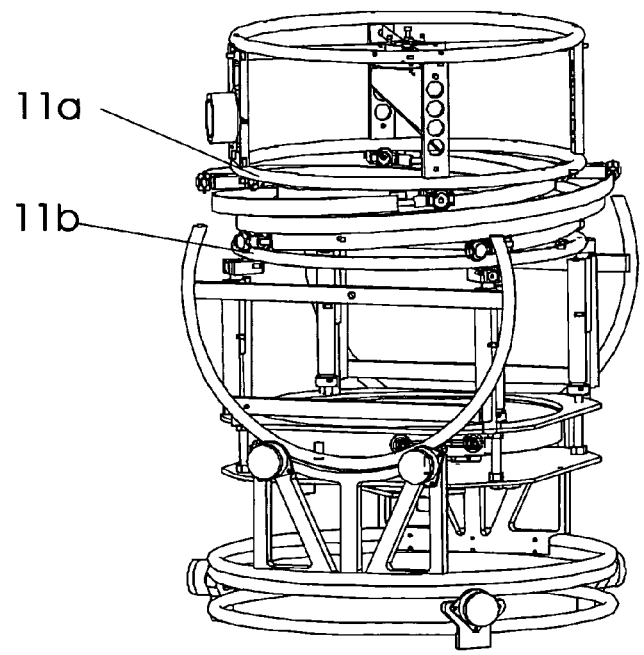
Figure 4C:
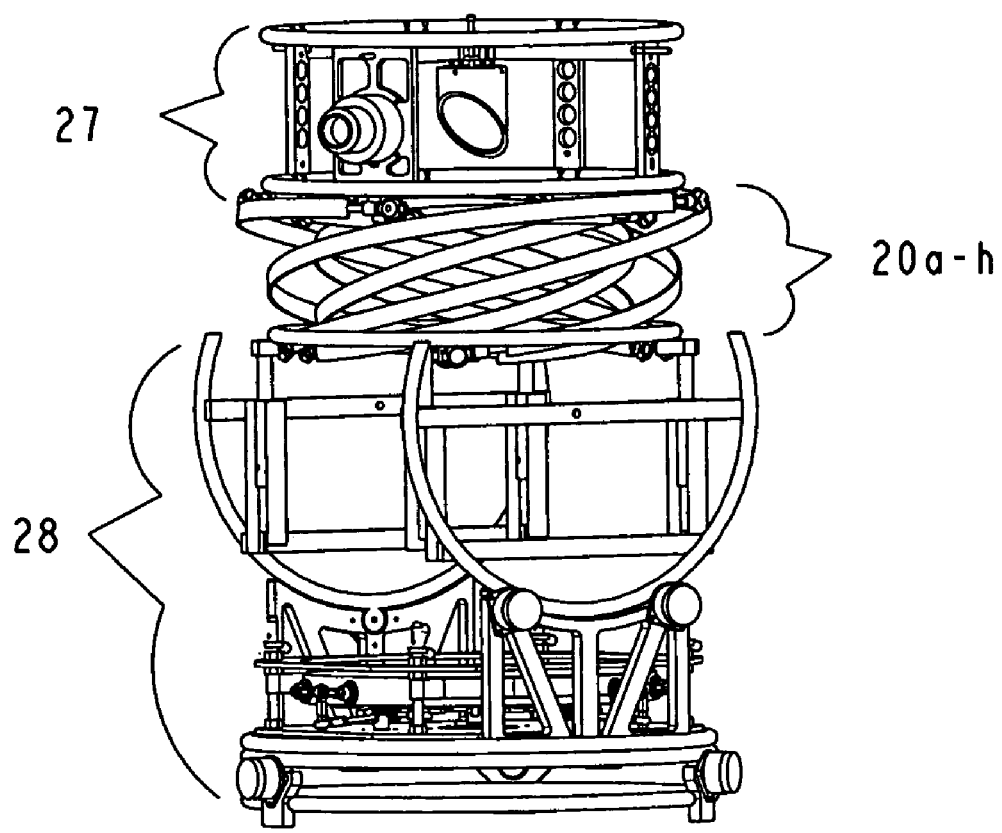

Referring to FIGS. 4a-e, there is presented the deployment sequence from a stowed state of minimized volume (FIG. 4a), to deployed and rigid locked state of maximized volume (FIGS. 4c, d, and e). Referring to FIG. 4a, there is shown the present invention in a partially disassembled state for storage and transport. Truss elements 20a-h are in their flattened and simultaneously curved states. Since the array of truss elements are equally spaced around the peripheries of end rings 11a, 11b, and 12, the net axial forces are balanced to effect zero net load on the collapsed structure, thus making it stable, and requiring little to zero holding force to keep it in this position. Referring FIG. 4b, there is seen the present invention in a minimum volume assembled state. Referring to FIG. 4c, there is shown the beginning of the extension process, wherein upper tube assembly 27 is pulled or extended away from rocker assembly 28. It is possible to also add automated means to allow for a controlled deployment, but in the present invention, upper tube assembly 27 is very easily lifted away from rocker assembly 28. Referring to FIG. 4d, truss elements 20 assume their straightened, but flattened, state. In this state, the entire structure lacks substantive rigidity, as adjacent truss elements are positioned in parallel pairs 20a/b, 20c/d, 20e/f, and 20g/h. These pairs have nearly equal length attachment points, as can be seen from FIG. 4-d. Referring to FIG. 4e, there is witnessed a rotation of deployment ring 12 which in the preferred embodiment is shown as the outer of the two rings 11b, and 12. These concentric rings 12 and 11b allow for alternating attachment of truss elements 20a-h. Attached to fixed inner ring 11b are truss ends 20a,c,e,g. Attached to outer rotationally moveable deployment ring 12 are affixed truss ends 20b,d,f,h. Thus, in the stowed state, deployment ring 12 is rotated to create parallel pairs of trusses 20a/b, 20c/d, 20e/f, and 20g/h. This is necessary in that all truss elements are of about equal length in order to triangulate into the fully rigid deployed truss structure of FIG. 4e. In order for truss pairs 20a/b, 20c/d, 20e/f, and 20g/h have equal curvatures when stowed, given that each pair shares a common attachment point on upper tube assembly end ring 11a, outer deployment ring 12 therefore rotates to bring opposing ends of each pair very close to one another as shown in FIG. 4d. After initial deployment to the state shown in FIG. 4d, outer deployment ring 12 rotates with respect to inner ring 11b by somewhat less than 90 degrees, to effect a separation and triangulation of truss pairs 20a/b, 20c/d, 20e/f, and 20g/h. This condition is shown in FIG. 4f. Finally, all trusses become very stiff and rigid by folding truss outrigger beams 24 with respect to central beam 21 to create a triangular cross sectional moment of inertia, as shown in FIG. 2.

Other innovations and improvements can be seen over the prior art, as shown in the attached figures. Particular improvement over the prior art provide for the adjustment by the user of center-of-gravity adjustment about altitude rotational axis 41, shown in FIG. 2, by means of mirror cell longitudinal support tubes 42 and 43. In the present invention, a pair of such tubes is placed at each corner of primary mirror cell 44, said tubes being slidably clamped into retaining blocks 45. Thus, the telescope owner can accommodate heavy or light equipment places at prime focus 15 of the upper tube assembly 27, and adjust the relative position of mirror cell 44 and upper tube assembly 27 to affect proper balance.

Other significant improvement over the prior art occur in the construction of the base azimuth bearing 48, as shown again in FIG. 2. Side rocker panels 46a and 46b attach to a large diameter ring 47, which serves as the traditional azimuth bearing of the telescope. Base ring 48, which is generally fixed and supported by the ground, has fixedly attached roller type or friction type bearings 49 at 3 equidistant places, to allow for rotation of rocker assembly 50, being generally comprised of elements 47, 46a, and 46b. Thus is created a generally hollow rocker and azimuth base assembly into which can nest the other telescope components when necessary for disassembly and storage.

I claim:

1. A space frame structure capable of deployment or retraction comprising multiple truss elements, multiple beam elements forming each one of said multiple truss elements, and each one of said truss elements being capable of existing in either a straight and rigid condition, or existing in a curved and flexible condition, with opposed ends of said truss elements connected to at least two other structural elements desired to be held spaced apart in a prescribed orientation.

2. A space frame structure capable of deployment or retraction comprising multiple truss elements, multiple beam elements forming each one of said multiple truss elements, and each one of said truss elements being capable of existing in either a straight and rigid condition, or existing in a curved and flexible condition, with opposed ends of said truss elements connected to at least two other structural elements desired to be held spaced apart in a prescribed orientation; said multiple beam elements of each one of said truss elements comprising a single long beam having non-fully constrained end attachment points, and a hinge that connects said single long beam to one or more single beams which do not have constrained end attachment points, for the purpose of existing in either a straight and rigid condition, or to exist in a curved and flexible condition, depending on the angular orientation of said hinge.

3. The invention of claim 2, wherein the hinge comprises two fabric or membrane like strips of material sewn together to create pockets for the insertion of beam like truss elements, so as to effect a hinge apparatus at a line defined by the sewn seam separating two or more beam like truss elements.

4. The invention of claim 1 wherein said truss elements are comprised of a carbon fibre composite material.

5. The invention of claim 1, wherein the other structural elements comprise at least a fixed attachment ring and a rotateable deployment ring and-adjacent ones of said truss elements on one end of the at least two structural elements are connected on one end of the structure to the fixed attachment ring and on another end of the structure to the rotateable deployment ring, and said truss elements are configured to effect a condition of creating parallel truss pairs when it is desired to collapse the structure, and to likewise create a condition when it is desired to deploy and rigidify the structure by rotation of said deployment ring to triangulate successive truss pairs.

6. The invention of claim 5, wherein provision is made to automate and mechanize the apparatus for automatic deployment or automatic retraction.

* * * * *